3,794,663
N,N'-(9-OXOXANTHENE-2,7-DIYL)BIS[2-DI(LOWER)ALKYL-AMINOACETAMIDES]

Arthur A. Santilli, Havertown, Anthony C. Scotese, King of Prussia, and Stanley C. Bell, Penn Valley, Pa., assignors to American Home Products Corporation, New York, N.Y.
No Drawing. Filed Oct. 30, 1972, Ser. No. 302,380
Int. Cl. C07d 7/44
U.S. Cl. 260—335                                     2 Claims

ABSTRACT OF THE DISCLOSURE

N,N'-(9 - oxoxanthene - 2,7 - diyl)bis[2-di(lower) alkylaminoacetamides] have antiamebic activity.

---

This invention relates to N,N'-(9-oxoxanthene-2,7-diyl)bis[2-di(lower)alkylaminoacetamides].

The invention sought to be patented comprises chemical compounds of the formula:

[Structure I: R$^4$R$^3$NCH$_2$C(O)HN—(9-oxoxanthene-2,7-diyl)—NHC(O)CH$_2$NR$^2$R$^1$]

I wherein $R^1$, $R^2$, $R^3$, and $R^4$ are the same and are methyl, ethyl, propyl, or butyl; and the non-toxic pharmaceutically acceptable acid addition salts thereof. Said Compounds I exhibit in vitro antiamebic activity as demonstrated by evaluation in standard test procedures.

The reaction sequence for the production of the compounds of Formula I are illustrated schematically below, where $R^1$, $R^2$, $R^3$, and $R^4$ have the above-defined meanings.

[Structure A: H$_2$N—(9-oxoxanthene-2,7-diyl)—NH$_2$]

II

↓

[Structure B: ClCH$_2$C(O)HN—(9-oxoxanthene-2,7-diyl)—NHC(O)CH$_2$Cl]

III

↓

[Structure I: R$^4$R$^3$NCH$_2$C(O)HN—(9-oxoxanthene-2,7-diyl)—NHC(O)CH$_2$NR$^2$R$^1$]

I

The starting material for the production of the compounds of Formula I is 2,7-diamino-9-oxoxanthene (II) [see A. Goldberg et al., J. Chem. Soc., 1953, 1348]. In Step A, this compound is reacted with chloroacetyl chloride to afford (9-oxoxanthene-2,7-diyl)bis[2-chloroacetamide] (III). Amination of Compound III with a N,N-di(lower)alkylamine provides the final product (I). If desired, a compound of Formula I can be converted to its acid addition salt using conventional procedures, by treating the base in an unreactive solvent with a non-toxic pharmaceutically acceptable acid of sufficient acid strength. Such acids will be apparent to those skilled in the art. Among the suitable acids, are hydrochloric, hydrobromic, sulfuric, methanesulfonic, p-toluenesulfonic, maleic, tartaric, citric, and succinic.

The following examples illustrate the maner and processes for making and using the invention. All temperatures appearing in the examples are given in degrees centigrade.

EXAMPLE I 2,7-dinitro-9-oxoxanthene

To 90 ml. of fuming nitric acid (d. 1.5) is added with stirring over 30 minutes 30 g. of xanthone while the temperature is kept between 70° to 80°. The temperature of the reaction mixture is maintained at 70° for an additional 15 minutes and is then raised to 85° for 15 minutes more. The mixture is poured onto 1 kg. of cracked ice and the resulting precipitate collected. This material is treated with 500 ml. of boiling benzene and filtered. The filter cake is recrystallized from ethanol-N,N-dimethylacetamide giving 24 g. of the title compound.

EXAMPLE II 2,7-diamino-9-oxoxanthene

To a stirred mixture of 50 g. of stannous chloride dihydrate in 400 ml. of 10 N hydrochloric acid at 75° is added 9 g. of 2,7-dinitro-9-oxoxanthene. The reaction mixture is heated at 100° for 3 hours, and the mixture is filtered. The filter cake is dissolved in 600 ml. of water and is basified with 50% sodium hydroxide solution. The precipitate thus formed is filtered and washed with water to give 7.0 g. of the title compound, M.P. 262–264°.

EXAMPLE III (9-oxoxanthene-2,7-diyl)Bis[2-chloroacetamide]

A stirred mixture of 1 g. of 2,7-diamino-9-oxoxanthene in 30 ml. of chloroacetyl chloride is heated under reflux for 2 hours. The reaction mixture is filtered, and the filter cake is washed with benzene. This material is used directly as the starting compound in Example IV.

EXAMPLE IV

N,N'-(9-oxoxanthene-2,7-diyl)Bis[2-diethylaminoacetamide], dihydrochloride, hydrate A stirred mixture of 5 g. of (9-oxoxanthene-2,7-diyl)bis[2-chloroacetamide] and 20 ml. of diethylamine in 300 ml. of ethanol is heated under reflux for 6 hours. The reaction mixture is filtered, and the filtrate is cooled in ice. The precipitate thus formed is collected and recrystallized from benzene-petroleum ether. This material is dissolved in ether and acidified with ethereal hydrochloric acid solution to give 2.2 g. of the title compound, 290–294° d.

Analysis.—For $C_{25}H_{36}N_4O_5Cl_2$: Calc'd (percent): C, 55.25; H, 6.68; N, 10.31. Found (percent): C, 54.95; H, 6.60; N, 10.14.

EXAMPLE V

The in vitro antiamebic activity of the compounds of Formula I can be evaluated according to the following procedure:

The test substance is incorporated and diluted in an aqueous phase of modified Boeck-Drbohlav diphasic medium fortified with rice starch. The medium is inoculated with polybacteria and a known number of trophozoites of E. histolytica NIH 200. After 48-hours incubation, the trophozoites are counted. The above test is generally described by Thompson et al., Antibio. and Chemo., 6, 337 (1956).

When tested in the above manner, N,N'-(9-oxoxanthene - 2,7 - diyl)bis[2-diethylaminoacetamide], dihydrochloride, hydrate shows a 43% kill of *E. histolytica* at a concentration of 250 μg./ml.

What is claimed is:
1. A compound of the formula

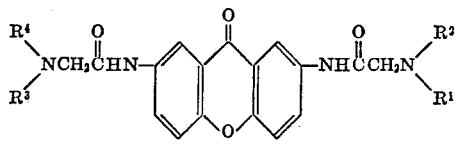

wherein $R^1$, $R^2$, $R^3$, and $R^4$ are the same and are methyl, ethyl, propyl, or butyl; and the non-toxic, pharmaceutically acceptable acid addition salts thereof.

2. The compound as defined in claim 1 which is N,N'-(9 - oxoxanthene - 2,7-diyl)bis[2-diethylaminoacetamide] and the non-toxic, pharmaceutically acceptable acid addition salts thereof.

References Cited

Chemical Abstracts, vol. 75 (1971), 140638n.

NORMA S. MILESTONE, Primary Examiner

U.S. Cl. X.R.

424—283